(12) United States Patent
Koo et al.

(10) Patent No.: US 7,570,763 B2
(45) Date of Patent: Aug. 4, 2009

(54) METHOD FOR SUBSCRIBING SERVICE AND DISTRIBUTING ENCRYPTION KEY BASED ON PUBLIC-KEY ENCRYPTION ALGORITHM IN DIGITAL CATV SYSTEM

(75) Inventors: Han-Seung Koo, Daejon (KR); O-Hyung Kwon, Daejon (KR); Soo-In Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 920 days.

(21) Appl. No.: 10/868,508

(22) Filed: Jun. 14, 2004

(65) Prior Publication Data
US 2005/0141712 A1    Jun. 30, 2005

(30) Foreign Application Priority Data
Dec. 27, 2003    (KR)    ........... 10-2003-0098272

(51) Int. Cl.
*H04N 7/167*    (2006.01)
(52) U.S. Cl. .............. 380/233; 380/231; 380/277; 705/30; 705/40
(58) Field of Classification Search .......... 380/231, 380/233, 277; 386/94; 348/E5.108; 705/30, 705/40
See application file for complete search history.

(56) References Cited

U.S. PATENT DOCUMENTS 5,862,299 A * 1/1999 Lee et al. ............ 386/94
6,330,670 B1 * 12/2001 England et al. .......... 713/2
6,577,734 B1 * 6/2003 Etzel et al. ............ 380/277
2004/0139012 A1 * 7/2004 Koskinen et al. ........ 705/40

FOREIGN PATENT DOCUMENTS

| KR | 1997-64233 | 9/1997 |
| KR | 2003-0068395 | 8/2003 |

* cited by examiner

*Primary Examiner*—Thanhnga B Truong
(74) *Attorney, Agent, or Firm*—Blakely, Sokoloff, Taylor & Zafman

(57) ABSTRACT

A method for subscribing a service and distributing encryption key based on public-key encryption algorithm in a digital CATV system are disclosed. In accordance with an aspect of the present invention, there is provided a method including the steps of: a) generating a charged service application message; b) generating a session connection request message, signing based on a digital signature scheme with appendix on the session connection request message and transmitting to the head-end; c) generating a symmetric-based session key, signing a digital signature on the key, encrypting based on a public-key of the subscriber, transmitting the session key to the subscriber; decrypting the session key message, verifying the digital signature, extracting the session key from the session key message and storing at a Condition Access Module; and d) signing a digital signature on the charged service request message, encrypting using the extracted session key and transmitting to the head-end.

13 Claims, 5 Drawing Sheets

METHOD FOR SUBSCRIBING SERVICE AND DISTRIBUTING ENCRYPTION KEY BASED ON PUBLIC-KEY ENCRYPTION ALGORITHM IN DIGITAL CATV SYSTEM

FIELD OF THE INVENTION

The present invention relates to a method for subscribing a service and distributing an encryption key based on public-key encryption algorithm in a digital CATV system; and in particular, to a method for requesting to a charged service safely through subscribing a digital CATV service through a cable return channel and for enhancing the safety of the encryption system by distributing an Authorization key (AK) and a Channel Key (CK) based on a symmetric session key set by a head-end and a subscriber based on a public-key protocol.

DESCRIPTION OF RELATED ART

In a digital CATV system, a Conditional Access System (CAS) is used to provide a charged service. The CAS encrypts the charged service based on an encryption algorithm and provides the charged service to only subscribers requesting the charged service.

The CAS uses a hierarchical key system for efficient conditional access. The CAS encrypts an audio and video data by scrambling the audio and video data based on a Control Word (CW) and encrypts the CW based on a Channel Key (CK) outranking the CW.

Though the CAS has some differences from another CAS, in general, the CK is encrypted using an Authorization Key (AK).

Because various kinds of keys are used in the CAS, the method for efficiently managing the keys is strongly required.

"DigiPass" is based on a symmetric encryption technique, which is one of the conventional CAS for the digital broadcasting developed by the same assignee with this application, Electronics and Telecommunications Research Institute (ETRI). In order to generate keys using an entity authentication, a symmetric key is generated based on a method consented by a broadcasting station and a subscriber. Herein, the consented method is described as below. The broadcasting station and the subscriber share a key generation matrix and a key generator. The broadcasting station transmits indexes of a generation key and an expansion key to the subscriber and the subscriber generates a key based on the indexes, wherein the key is identical to the key of the broadcasting station.

Assuming the key generation table is stored safely, because only the authenticated subscriber can generate the identical key with that of the broadcasting station, indirectly, the broadcasting station authenticates the entity of the subscriber and distributes the encryption key at the same time. The conventional CASs have a drawback that they can't guarantee the safety. Because the "DigiPass" has to manage not only the keys but the key generating matrix, "DigiPass" has limitation to the safety of the system.

Also, because "DigiPass" have to generate an encryption key in the subscriber's Conditional Access Module (CAM), there is a drawback as the computation load to the receiver.

SUMMARY OF THE INVENTION

It is, therefore, an object of the present invention to provide a method for subscribing a digital CATV service through a cable return channel so that the subscriber can safely request a charged service; a head-end and a subscriber generate a symmetric-based session key and distribute a Authorization Key (AK) and a Channel Key (CK) using the session key in order to increase a safety of an encryption system.

In accordance with an aspect of the present invention, there is provided method for subscribing a service through a return channel using a receiver of a subscriber, the method including the steps of: a) generating a charged service application message will be transmitted to a head-end by the receiver of the subscriber through a cable return channel; b) generating a session connection request message, signing based on a digital signature scheme with appendix on the session connection request message and transmitting to the head-end by the subscriber; c) at the head-end, generating a symmetric-based session key, signing a digital signature on the session key based on digital signature scheme with appendix, encrypting using a public-key of the subscriber, transmitting the session key to the subscriber; at the subscriber's receiver, decrypting the session key message, verifying the digital signature, extracting the session key from the session key message and storing at an inner memory of a Condition Access Module (CAM); and d) at the subscriber's receiver, signing a digital signature on the charged service request message, based on the digital signature scheme with appendix, encrypting using the extracted session key and transmitting to the head-end.

In accordance with another aspect of the present invention, there is provided a method for distributing a encryption key of a digital CATV system based on a public-key encryption algorithm, the method including the steps of: a) at the head-end, transmitting a session key to the receiver of the subscriber who requests the charged service in response to the request for the charged service of the digital CATV service by the subscriber; b) at the head-end, encrypting the AK using the session key and transmitting the encrypted AK to the subscriber's receiver; and c) at the head-end, encrypting a Channel Key (CK) using the distributed Authorization Key (AK) and transmitting to the subscriber's receiver.

In accordance with another aspect of the present invention, there is provided a method for subscribing a charged service and distributing an encryption key based on a public-key encryption algorithm in accordance with an embodiment of the present invention, the method including the steps of: a) at the subscriber, determining whether an online subscription or an offline subscription for the charged service; b) if the subscriber requests the charged service in online, at the subscriber, determining whether a PSTN, internet or a cable return channel; c) if the subscriber determines the PSTN subscription, at the subscriber, calling the registration authority (RA) and requesting for the charged service; d) if the subscriber determines the internet subscription, at the subscriber, connecting to the RA site, setting up the internet security connection as Secure Socket Layer (SSL) and requesting the charged service; and e) if the subscriber determines the cable return channel, at the subscriber, selecting the charged service using the digital program guide and the remote controller and generating a charged service request message include the selected charged service information.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
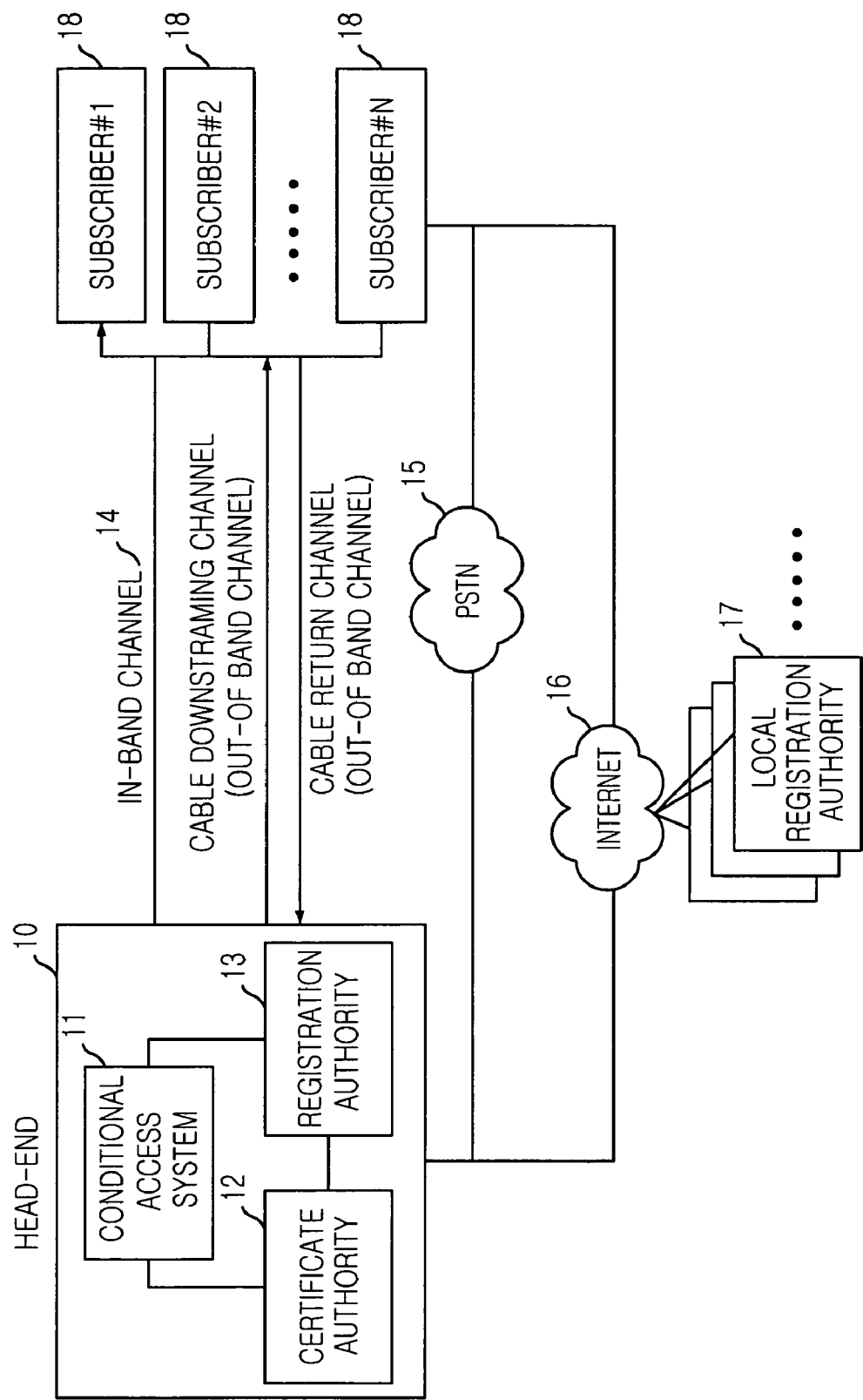
FIG. 1 is a block diagram showing a digital CATV system for subscribing a CATV service and requesting a charged service of the CATV service in accordance with an embodiment of the present invention.

FIG. 1 is a block diagram showing a digital CATV system for subscribing a CATV service and requesting a charged service of the CATV service in accordance with an embodiment of the present invention.

A head-end 10 includes a Conditional Access System (CAS) 11, a Certificate Authority (CA) 12 and a registration authority 13.

The CAS 11 generates various encryption keys, Authorization Key (AK) messages and Channel key (CK) messages, and transmits them to a subscriber.

The CA 12 manages certificates. The registration authority 13 manages subscribers include a service subscription.

The head-end 10 transmits audio and video data to the subscriber through an in-band channel of a cable network 14. The subscriber 18 can request for a charged service using a return channel in an out-of-band in the cable network 14.

The subscriber 18 subscribes to the CATV service and requests the charged service through a public switched telephone network (PSTN) 15 or Internet 16.

The local registration authority 17 located out of the head-end 10 receives subscriptions for the CATV service and the charged service.

Figure 2:
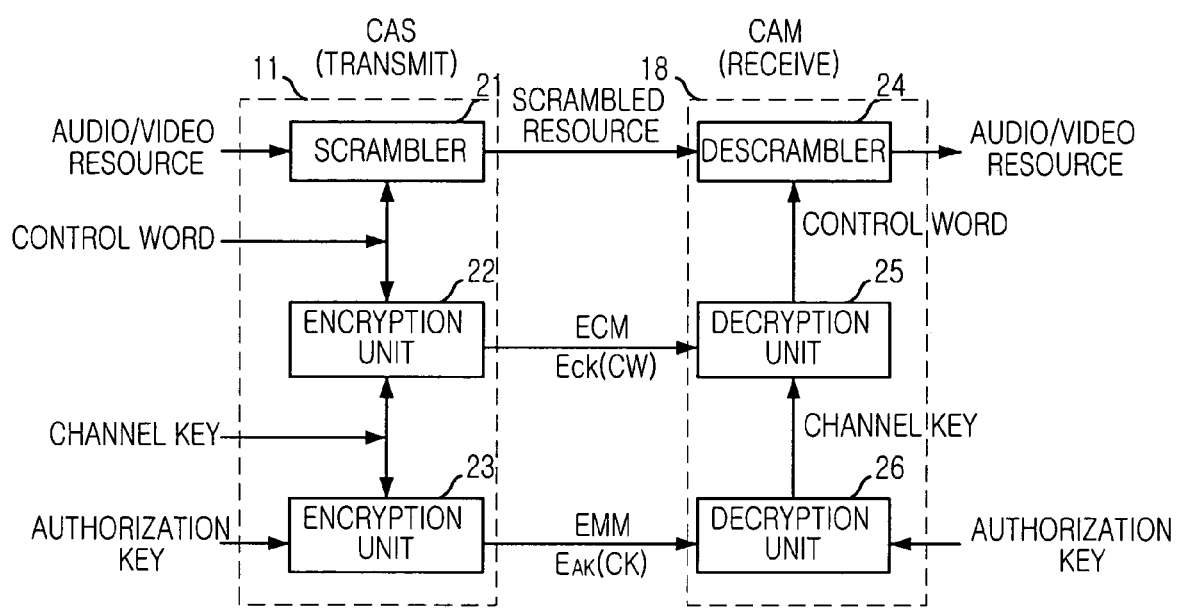
FIG. 2 is a block diagram illustrating an encryption and decryption method in the digital CATV system in accordance with the embodiment of the present invention.

FIG. 2 is a block diagram illustrating an encryption and decryption method in the digital CATV system in accordance with the embodiment of the present invention.

First of all, the CAS 11, which is a transmitting part, using a scrambler 21, scrambles audio and video data based on a Control Word (CW) and transmits the scrambled resource to a receiving part. Herein, the CW is encrypted based on the CK and transmitted to the receiving part through an Entitlement Control Message (ECM).

Finally, the CK is encrypted based on the AK and transmitted to the receiving part.

In the other hand, a receiver 18 having the Conditional Access Module (CAM) of the subscriber decrypts an Entitlement Management Message (EMM) using a decryption unit 26 and the AK and extracts the CK.

Thereafter, the receiver 18 decrypts the encrypted ECM and extracts the CW.

Finally, the receiver 18 restores the audio and video data by descrambling the scrambled resources using the CW and a descrambler 24.

Figure 3:
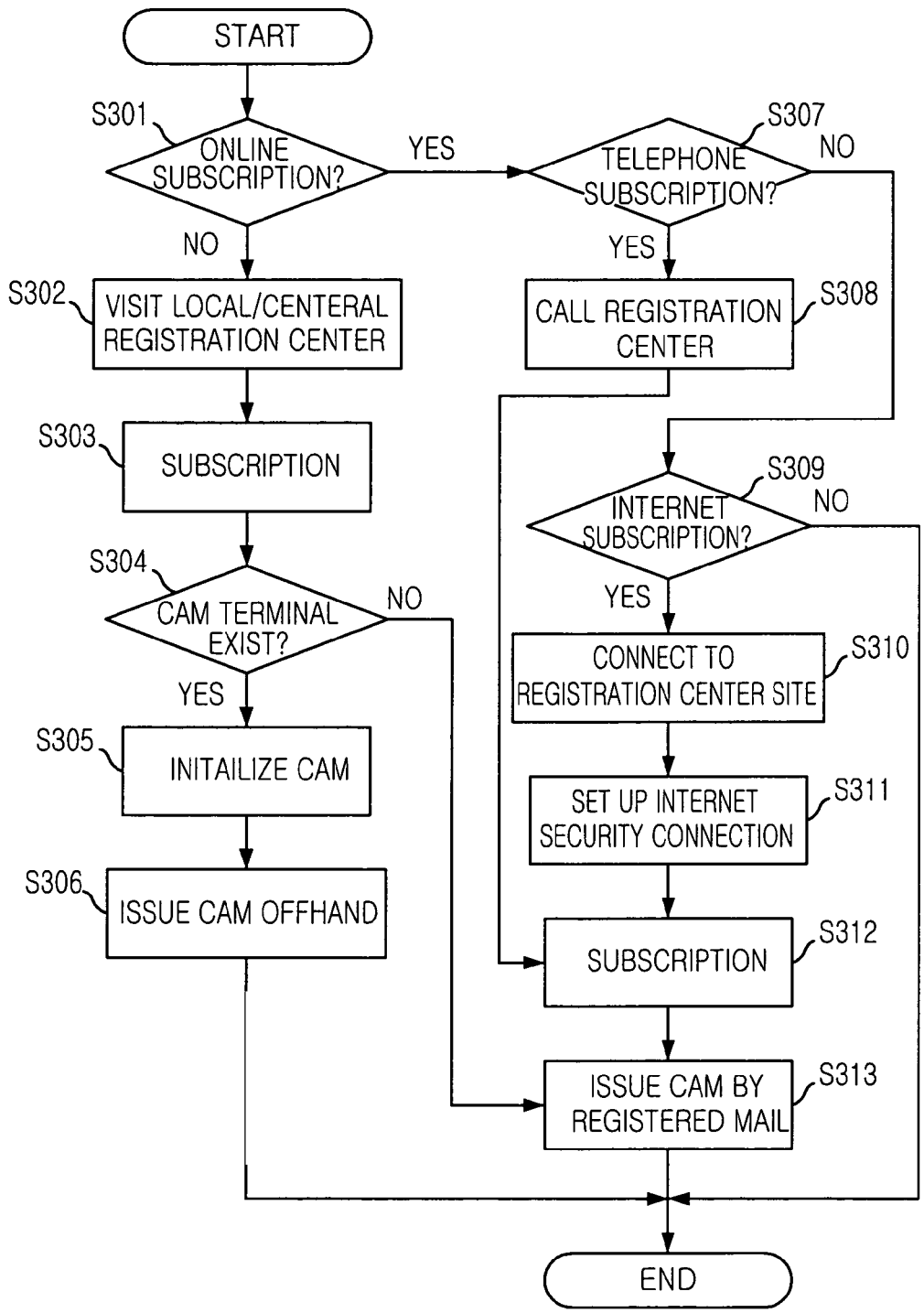
FIG. 3 is a flowchart describing a method for subscribing the digital CATV service in accordance with the embodiment of the present invention.

FIG. 3 is a flowchart describing a method for subscribing the digital CATV service in accordance with the embodiment of the present invention.

At step S301, a user who wants to subscribe to the CATV service selects one of an online subscription and an offline subscription.

After, at step S302, if the user selects the offline subscription, the user visits a central registration authority located in the head-end 10 or a local registration authority located out of the head-end and, at step S303, subscribes to the service.

At step S304, the subscriber checks whether a Conditional Access Module (CAM) terminal exists or not in the local/central registration authority. At step S305, if there is the CAM terminal, the CAM terminal initializes the CAM. The initialization of the CAM includes processes of a) storing a certificate of an authorization, b) storing the certificate of the head-end and generating and storing a public-key and a personal-key of the subscriber (3).

Finally, at step S306, a subscription process is completed with issuing the initialized CAM to he subscriber.

At step S313, if there is no CAM in the step S304, the local registration authority transmits subscriber's registration information, and initializes the CAM in the central registration authority recited in the step S305, and sends the initialized CAM and an activation number to the subscriber using a registered mail.

At step S309, if the applicant selects the online subscription in the step S301, the user can subscribe to the CATV service using the telephone at the step S307 or the internet.

At the step S307, when subscribing using the telephone, the user calls the registration authority.

At step S310, when subscribing using the internet, the user connects to the head-end registration authority site, at step S311, the user sets up internet security connection and, at step S312, subscribes to the CATV service.

At step S313, the head-end registration authority initializes the CAM and sends the initialized CAM by the registered mail.

After receiving an activation number by the registered mail, the user goes through the following steps.

(1) the subscriber calls the head-end registration authority and reports receiving the CAM by telling the activation number.

(2) if confirming the subscriber got the CAM at step (1), head-end registration authority prepares for the subscription.

Figure 4:
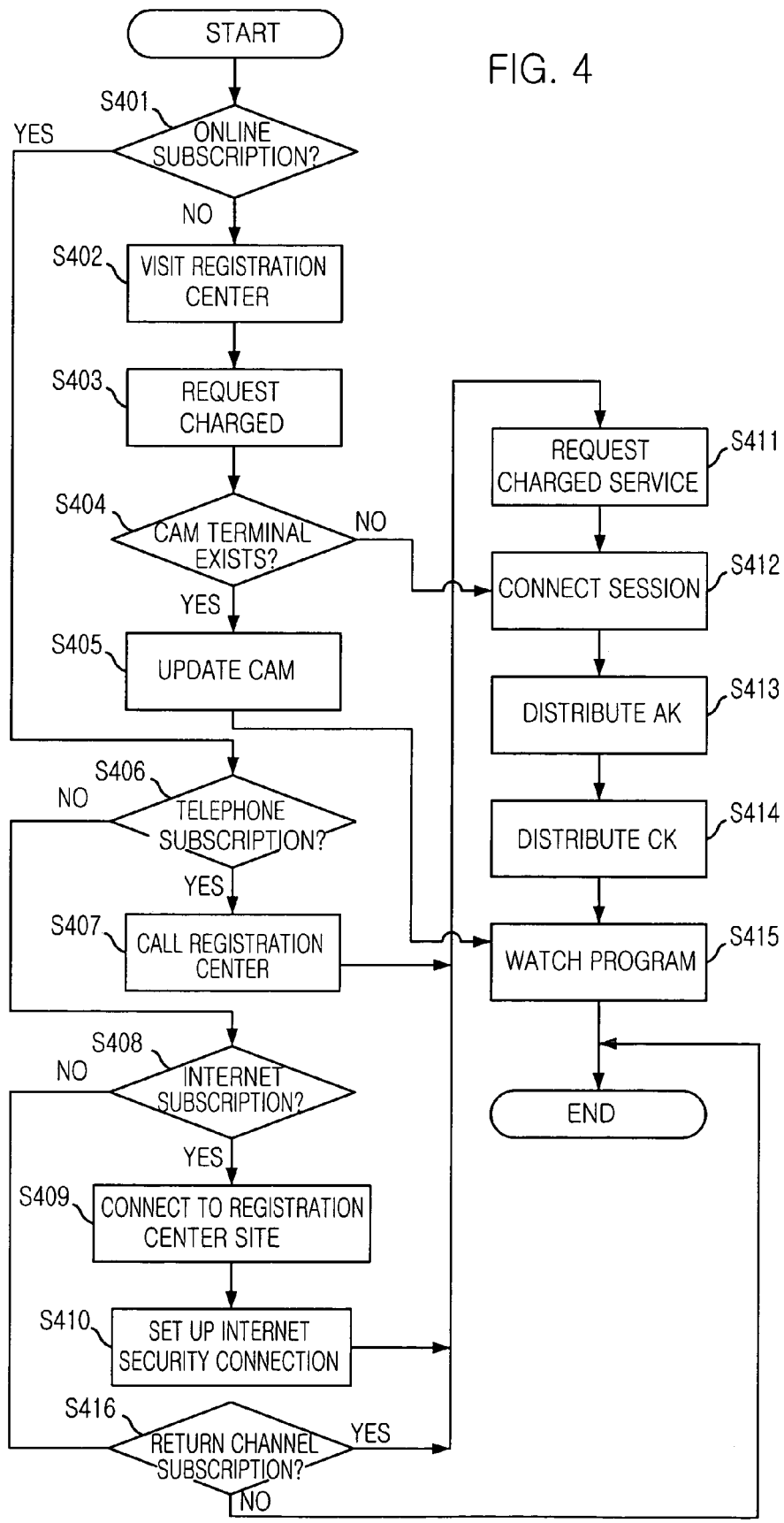
FIG. 4 is a flowchart showing a method for subscribing a digital CATV service and distributing encryption keys based on a public-key encryption algorithm in accordance with the embodiment of the present invention.

FIG. 4 is a flowchart showing a method for subscribing a charged service and distributing an encryption key based on a public-key encryption algorithm in accordance with an embodiment of the present invention.

At step S401, the subscriber selects one of an online subscription and an offline subscription for the charged service.

Thereafter, if the subscriber selects the offline, at step S402, the subscriber visits a near registration authority and, at step S403, subscribes to the charged service.

At step 404, the subscriber checks whether the CAM terminal exists or not in the registration center. At step S405, if there is the CAM terminal, the subscriber stores the AK and the CK required for the request in the CAM. At step S412, if there is not the CAM, the subscriber prepares for connecting a session.

The process for connecting sessions is described as following steps.

(1) the head-end monitors that the CAM module of the subscriber requesting the charged service is inserted. Wherein, the head-end checks a transmission of an insertion alarm message when the CAM is inserted into a subscriber's receiver.

(2) if the head-end 10 receives the insertion alarm message, that is, the CAM module corresponding to the subscriber requesting the charged service through the registration authority is inserted into the subscriber's receiver.

(3) the head-end 10 encrypts a digital signature, i.e., a session key message using the public-key of the subscriber and transmits to the subscriber.

(4) the subscriber verifies the digital signature after decrypting the session key transmitted from the head-end 10 using the personal-key. If the subscriber verifies successfully, the subscriber stores the session key at an internal memory of the CAM.

Figure 5:
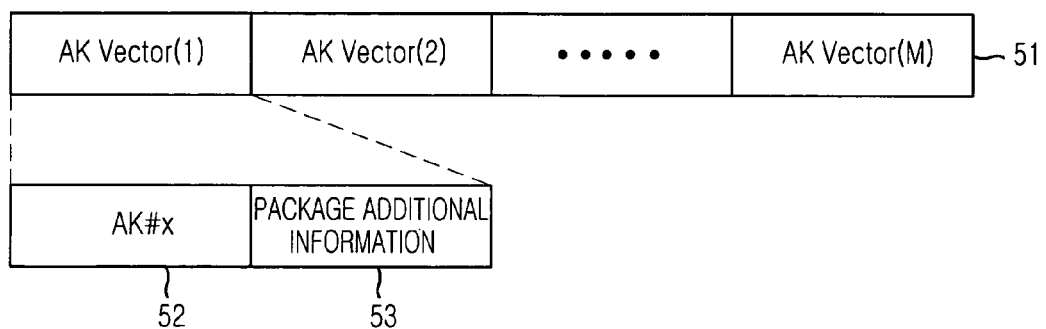
FIG. 5 is a diagram showing a structure of a Authorization Key (AK) in accordance with the embodiment of the present invention.

At step S413, after sharing the session key, referred to the step S412, a request process is completed with issuing the initialized CAM to the subscriber, the head-end distributes the AK which is illustrated in the FIG. 5. The AK includes N AK Vectors 51 (N is an integer) encrypted using the session key achieved according to the step S412 and is transmitted to the subscriber. Wherein, the N is a number of the charged services requested by the subscriber. The AK vector includes a symmetric key, i.e., AK 52 and package information 53 of the charged service related to the AK.

At step S414, after distributing the AK at the step S412, the CK is distributed. Wherein, the head-end generates the CK message, encrypts the CK message using the AK and distributes to the subscriber.

The CK includes L Pkg Vectors 61. L is a total number of the charged services provided by the head-end. The Pkg vector 61 includes M channel (CH) vectors 62. M is a total number of channels used for each charged service. Each CH vector includes a symmetric encryption key, i.e., CK 63 and channel information 64 related to the CK 63.

At step S405, after channel key distribution, the subscriber decrypts the CW using the distributed CK and watching TV programs by descrambling the scrambled audio and video data. Herein, the process for decrypting the CW using the AK and the CK is described in FIG. 2.

At the result of the step S401, if the subscriber requests the charged service in online, there are three types of the subscription, the telephone 406, the internet 408 and the cable return channel.

First, at step S407, in the case of using telephone, referred to the step S401 and S406, the subscriber calls the registration authority, at step S411, the subscriber requests for the charged service. As recited in the step S404, next steps are identical with the steps used when the CAM terminal doesn't exist, from the step S412 to S415. Accordingly, the description on the operations after the step S411 will be skipped.

Second, at the step S409, in the case of using the internet, referred to the step S401, S406 and S408, the transceiver of the subscriber connects to the registration authority site, at step S410, sets up the internet security connection as Secure Socket Layer (SSL) and, at step S411, requests the charged service. As recited in the step S404, next steps are identical with the steps used when the CAM terminal doesn't exist, i.e., the step S412 or S415.

Third, in the case of using the cable return channel, referred to the step S401, S406, S408 and S416, a digital program guide and a remote controller are used for requesting the charged service through the cable return channel. The detail procedure is described as following steps.

(1) the subscriber selects the charged service using the digital program guide and the remote controller; and (2) the subscriber generates a charged service request message having the selected charged service information.

Thereafter, the subscriber generates a session key using the session connection, referred to the step S412, and transmits the charged service request message generated using the session key to the head-end. The detail procedure is described as following steps.

(1) the subscriber generates a session connection request message, signs a digital signature on the request message and transmits the signed message to the head-end 10;

(2) if the head-end 10 successfully verifies the digital signature of the transmitted message from the subscriber, referred to the step (1), the head-end 10 generates a symmetric-based session key and make a digital signature using a message-added digital signature technique;

(3) the head-end 10 encrypts a session key message using the public-key of the subscriber and transmits the encrypted message to the subscriber.

(4) the subscriber decrypts the session key message and verifies the digital signature;

(5) if the subscriber successfully verifies the digital signature, the subscriber extracts the session key from a session key message and stores the session key at a memory;

(6) the subscriber makes a digital signature on the charged service request message, encrypts the charged service request message using the session key and transmits the encrypted charged service request message to the head-end 10;

(7) the head-end 10 decrypts the encrypted charged service request message using the session key and verifies the digital signature; and (8) if the head-end 10 successfully verifies the digital signature, the head-end 10 accepts the charged service requested by the subscriber and goes to next step.

Meanwhile, after the session connection, as recited in the step S404, next steps are identical with the steps used when the CAM terminal doesn't exist, i.e., the step S412 or S415.

FIG. 5 is a diagram showing a structure of the Authorization Key (AK) in accordance with the embodiment of the present invention.

The AK message includes N AK Vectors 51. Each of the AK vectors includes the AK 52, which is a symmetric-based key, and package information 53 of the charged service related to the AK. N is the number of the charged services requested by the subscriber.

Figure 6:
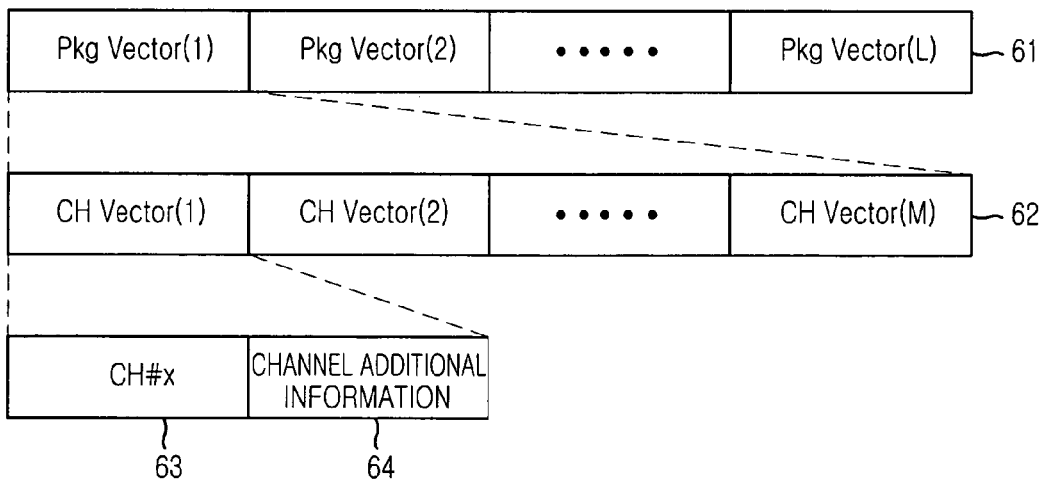
FIG. 6 is a diagram showing a structure of a Channel key (CK) in accordance with the embodiment of the present invention.

FIG. 6 is a diagram showing a structure of a Channel key (CK) message in accordance with the embodiment of the present invention.

The CK includes L Pkg Vectors 61. L is a total number of the charged services provided by the head-end.

Each of the Pkg vectors 61 includes M CH vectors 62. M is a total number of channels used for each charged service.

Each CH vector includes the symmetric-based encryption key, i.e., CK 63 and the channel additional information 64 related to the CK 63.

The method in accordance with the present invention can be embodied as a program and stored in recording media readable by a computer, e.g., CD-ROM, RAM, floppy disk, hard disk, magneto-optical disk, etc.

The method of the present invention provides the online/offline subscription service safely, in particular, for the subscription of the charged service through a cable return channel, provides the integrity and non-repudiation of the message based on the digital signature scheme.

The method provides a Conditional Access System (CAS) only depended on the confidentiality of a key, generates a session key based on an encryption protocol and distributes an Authentication Key (AK) and the Channel Key (CK) based on the session key.

The method decreases the load of a computing power for generating an encryption key in a subscriber's CAM as "Digi-Pass".

The method provides a digital TV CAS based on PKI. Because the CAS works with a Certificate Authority (CA) and a Registration Authority (RA) in the head-end, the method provides an encryption system as effective as the encryption system based on the PKI.

The present application contains subject matter related to Korean patent application no. 2003-79003, filed in the Korean intellectual Property Office on Nov. 10, 2003, the entire contents of which being incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for distributing an encryption key of a digital CATV system based on a public-key encryption algorithm, the method comprising the steps of:
   a) at a head-end, transmitting a session key to a receiver of the subscriber who requests the charged service in response to the request for the charged service of the digital CATV service;
   b) at the head-end, encrypting an authorization key (AK) using the session key and transmitting the encrypted AK to the subscriber's receiver; and
   c) at the head-end, encrypting a Channel Key (CK) using the AK and transmitting the encrypted CK to the subscriber's receiver, wherein the step a) includes the steps of:
   a1) at the head-end, monitoring an insertion of the Condition Access Module (CAM) to the subscriber's receiver when the subscriber requests a charged service to a Registration Authority (RA) having no Condition Access Module (CAM) terminal, through a telephone or a network;
   a2) at the head-end, generating a session key message to be transmitted to the subscriber's receiver when receiving an alarm message that the Condition Access Module (CAM) is inserted to the subscriber's receiver, and signing a digital signature on the session key message based on digital signature scheme with an appendix;
   a3) at the head-end, encrypting the digital signed session key message based on a public-key of the subscriber and transmitting the encrypted session key message to the subscriber's receiver; and
   a4) at the subscriber's receiver, decrypting the encrypted session key message received from the head-end, verifying the digital signature, extracting the session key from the session key message and storing the session key on the Condition Access Module (CAM).

2. The method as recited in claim 1, wherein the subscriber receives a Conditional Access Module (CAM) and an activation number, reports receipt of the CAM to the head-end and gets ready to watch the charged service.

3. The method as recited in claim 1, wherein the step a) includes the steps of:
   a1) at the subscriber's receiver, generating the charged service request message;
   a2) at the subscriber's receiver, generating a session connection request message, signing a digital signature on the session connection request message based on a digital signature scheme with an appendix and transmitting the signed session connection request message to the head-end;
   a3) at the head-end, verifying the digital signature, generating the symmetric-based session key and signing the digital signature based on the digital signature scheme with the appendix;
   a4) at the head-end, encrypting the session key message based on the public-key of the subscriber and transmitting the encrypted session key message to the subscriber's receiver;
   a5) at the subscriber's receiver, decrypting the encrypted session key message, verifying the digital signature, extracting a session key from the session key message and storing the session key;
   a6) at the subscriber's receiver, signing a digital signature on the charged service request message based on a digital signature scheme with appendix, encrypting the signed charged service request message based on the extracted session key and transmitting the encrypted charged service request message to the head-end; and
   a7) at the head-end, decrypting the encrypted charged service request message, verifying the digital signature and accepting the request charged service from the subscriber.

4. The method as recited in claim 1, wherein in the step b), the authorization key (AK) message includes the same number of AK vectors as the number of the charged services requested by the subscriber, and each of the AK vectors has a symmetric-based AK and a package of additional information of the charged service corresponding to the AK.

5. The method as recited in claim 1, wherein in the step c), the channel key (CK) message includes the same number Pkg vectors as the number of the charged services provided by the head-end, and each of the Pkg vectors has the same number of channel (CH) vectors as the number of the total channels, and each of the CH vector has a symmetric-based CK and the channel additional information.

6. A method for a subscriber to subscribe to a charged service and distributing an encryption key based on a public-key encryption algorithm, the method comprising the steps of:
   a) the subscriber selecting one of an online or an offline method through which the subscriber subscribes to the charged service;
   b) if the subscriber wants to requests the charged service through the online, determining whether a telephone, internet or a cable return channel is selected by the subscriber;
   c) if the subscriber selects the telephone, calling a registration authority (RA) and requesting the charged service;
   d) if the subscriber selects the internet, connecting to the RA site, setting up the internet security connection as a Secure Socket Layer (SSL) and requesting the charged service; and
   e) if the subscriber selects the cable return channel, selecting the charged service using a digital program guide and a remote controller and generating a charged service request message having the selected charged service information;
   wherein the generating a charged service request message includes:
   at the subscriber, generating a session connection request message, signing a digital signature based on a digital signature scheme with appendix on the session connection request message and transmitting the signed session connection request message to the head-end;
   if the head-end successfully verifies the digital signature in the transmitted session connection request message from the subscriber, at the head-end, generating a session key and signing a digital signature on the session key based on the digital signature scheme with appendix;

at the head-end, encrypting a session key message based on the public-key of the subscriber and transmitting the encrypted session key message to the subscriber;

at the subscriber, decrypting the session key message and verifying the digital signature;

if the subscriber successfully verifies the digital signature, at the subscriber, extracting the session key from the session key message and storing on the Condition Access Module (CAM);

at the subscriber, signing a digital signature on the charged service request message based on a digital signature scheme with appendix, encrypting the signed charged service request message using the session key and transmitting the encrypted charged service request message to the head-end;

at the head-end, decrypting the charged service request message using the session key and verifying the digital signature; and if the head-end successfully verifies the digital signature, at the head-end, accepting the charged service request by the subscriber.

7. The method as recited in claim 6, further comprising the steps of:
f) if the subscriber selects the offline, visiting the RA and requesting the charged service;
g) checking whether the CAM terminal exists or not in the RA; and
h) if the CAM exists in the RA, storing an Authorization Key and a Key in the CAM.

8. The method as recited in claim 6, further comprising the steps of:
i) if there is no CAM terminal, connecting a session;
j) at a head-end, distributing an authorization key (AK);
k) at the head-end, generating a CK message, encrypting the CK message using the AK and distributing the encrypted CK message to the subscriber; and
l) using the charged service.

9. The method as recited in claim 6, wherein the step c) includes the steps of:
c1) connecting a session;
c2) at a head-end, distributing an authorization key (AK);
c3) at the head-end, generating a CK message, encrypting the CK message using the AK and distributing the encrypted CK message to the subscriber; and
c4) using the charged service.

10. The method as recited in claim 9, wherein the step c1) includes the steps of:
at the head-end, monitoring that the CAM of the subscriber requesting the charged service is inserted, by checking a transmission of an insertion alarm message when the CAM is inserted into a subscriber's receiver;

if the head-end receives the insertion alarm message, at the head-end, generating the session key, signing a digital signature based on digital signature scheme with appendix on the session key;

at the head-end, encrypting the session key message based on the public-key of the subscriber and transmitting the encrypted session key message to the subscriber;

at the subscriber, verifying the digital signature scheme with appendix after decrypting the session key message transmitted from the head-end using the personal-key; and if the subscriber verifies successfully, storing the session key at an internal memory of the CAM.

11. The method as recited in claim 6, wherein the step d) includes the steps of:
d1) connecting a session;
d2) at a head-end, distributing an authorization key (AK);
d3) at the head-end, generating the CK message, encrypting the CK message using the AK and distributing the encrypted CK message to the subscriber; and
d4) using the charged service.

12. The method as recited in claim 11, wherein the step d1) includes the steps of:
at the head-end, monitoring that the CAM of the subscriber requesting the charged service is inserted, by checking a transmission of an insertion alarm message when the CAM is inserted into a subscriber's receiver;

if the head-end receives the insertion alarm message, at the head-end, generating the session key, signing a digital signature based on digital signature scheme with appendix on the session key;

at the head-end, encrypting the session key message based on the public-key of the subscriber and transmitting the encrypted session key message to the subscriber;

at the subscriber, verifying the digital signature scheme with appendix after decrypting the session key message transmitted from the head-end using the personal-key; and if the subscriber verifies successfully, storing the session key at an internal memory of the CAM.

13. The method as recited in claim 6, wherein the step e) includes the steps of:
e1) connecting a session;
e2) at a head-end, distributing an authorization key (AK);
e3) at the head-end, generating the CK message, encrypting the CK message using the AK and distributing the encrypted CK message to the subscriber; and
e4) using the charged service.

* * * * *